(12) United States Patent
Moore

(10) Patent No.: US 8,825,924 B2
(45) Date of Patent: *Sep. 2, 2014

(54) ASYNCHRONOUS COMPUTER COMMUNICATION

(75) Inventor: Charles H. Moore, Sierra City, CA (US)

(73) Assignee: Array Portfolio LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/932,713

(22) Filed: Mar. 4, 2011

(65) Prior Publication Data

US 2011/0185088 A1 Jul. 28, 2011

Related U.S. Application Data

(63) Continuation of application No. 11/355,495, filed on Feb. 16, 2006, now Pat. No. 7,904,615.

(51) Int. Cl.
*G06F 13/00* (2006.01)

(52) U.S. Cl.
USPC ............ 710/31; 710/58; 712/10; 712/11; 712/16

(58) Field of Classification Search
None
See application file for complete search history.

(56) References Cited

U.S. PATENT DOCUMENTS

| | | | |
|---|---|---|---|
| 3,757,306 A | 9/1973 | Boone | 712/32 |
| 3,868,677 A | 2/1975 | Kidd | 341/157 |
| 4,107,773 A | 8/1978 | Gilbreath et al. | 712/36 |
| 4,215,401 A | 7/1980 | Holsztynski et al. | 382/304 |
| 4,215,422 A | 7/1980 | McCray et al. | 400/62 |
| 4,298,932 A | 11/1981 | Sams | 711/202 |
| 4,360,913 A * | 11/1982 | Struger et al. | 370/535 |
| 4,462,074 A | 7/1984 | Linde | 712/241 |
| 4,589,067 A | 5/1986 | Porter et al. | 712/9 |
| 4,593,351 A | 6/1986 | Hong et al. | 712/21 |
| 4,631,659 A * | 12/1986 | Hayn et al. | 711/167 |
| 4,665,494 A | 5/1987 | Tanaka et al. | 702/77 |
| 4,672,331 A | 6/1987 | Cushing | 331/65 |

(Continued)

FOREIGN PATENT DOCUMENTS

| | | | |
|---|---|---|---|
| CN | 1051995 A | 6/1991 | G06F 15/16 |
| DE | 3937807 | 5/1990 | G06F 13/42 |

(Continued)

OTHER PUBLICATIONS

U.S. Appl. No. 10/801,942, Office Action dated Mar. 10, 2009.

(Continued)

*Primary Examiner* — Steven Snyder
(74) *Attorney, Agent, or Firm* — Edward P. Heller, III

(57) ABSTRACT

A computer array (10) has a plurality of computers (12). The computers (12) communicate with each other asynchronously, and the computers (12) themselves operate in a generally asynchronous manner internally. When one computer (12) attempts to communicate with another it goes to sleep until the other computer (12) is ready to complete the transaction, thereby saving power and reducing heat production. A plurality of read lines (18), write lines (20) and data lines (22) interconnect the computers (12). When one computer (12) sets a read line (18) high and the other computer sets a corresponding write line (20) then data is transferred on the data lines (22). When both the read line (18) and corresponding write line (20) go low this allows both communicating computers (12) to know that the communication is completed. An acknowledge line (72) goes high to restart the computers (12).

30 Claims, 4 Drawing Sheets

(56) References Cited

U.S. PATENT DOCUMENTS

| | | | |
|---|---|---|---|
| 4,739,474 A | 4/1988 | Holsztynski | 712/14 |
| 4,742,511 A | 5/1988 | Johnson | 370/406 |
| 4,789,927 A | 12/1988 | Hannah | 712/16 |
| 4,821,231 A | 4/1989 | Cruess et al. | 710/110 |
| 4,868,745 A | 9/1989 | Patton et al. | 711/202 |
| 4,961,167 A | 10/1990 | Kumanoya et al. | 365/189.09 |
| 4,984,151 A | 1/1991 | Dujari | 712/241 |
| 5,021,947 A | 6/1991 | Campbell et al. | 712/25 |
| 5,029,124 A | 7/1991 | Leahy et al. | 710/105 |
| 5,053,952 A | 10/1991 | Koopman, Jr. et al. | 712/248 |
| 5,159,338 A | 10/1992 | Takahashi | 341/61 |
| 5,218,682 A | 6/1993 | Frantz | 710/105 |
| 5,317,735 A | 5/1994 | Schomberg | 712/203 |
| 5,319,757 A | 6/1994 | Moore et al. | 712/32 |
| 5,359,568 A | 10/1994 | Livay et al. | 365/221 |
| 5,375,238 A | 12/1994 | Ooi | 712/241 |
| 5,377,333 A | 12/1994 | Nakagoshi et al. | 710/317 |
| 5,386,585 A | 1/1995 | Traylor | 712/29 |
| 5,390,304 A | 2/1995 | Leach et al. | 712/241 |
| 5,396,609 A | 3/1995 | Schmidt et al. | 711/163 |
| 5,434,989 A | 7/1995 | Yamaguchi | 711/3 |
| 5,440,749 A | 8/1995 | Moore et al. | 712/206 |
| 5,475,856 A | 12/1995 | Kogge | 712/20 |
| 5,485,624 A | 1/1996 | Steinmetz et al. | 712/34 |
| 5,535,393 A | 7/1996 | Reeve et al. | 717/149 |
| 5,535,417 A | 7/1996 | Baji et al. | 710/22 |
| 5,550,489 A | 8/1996 | Raab | 326/93 |
| 5,551,045 A | 8/1996 | Kawamoto et al. | 713/2 |
| 5,581,767 A | 12/1996 | Katsuki et al. | 712/11 |
| 5,630,154 A | 5/1997 | Bolstad et al. | 712/19 |
| 5,657,485 A | 8/1997 | Streitenberger et al. | 712/245 |
| 5,673,423 A | 9/1997 | Hillis | 713/375 |
| 5,692,197 A | 11/1997 | Narad et al. | 713/323 |
| 5,706,491 A | 1/1998 | McMahan | 712/234 |
| 5,727,194 A | 3/1998 | Shridhar et al. | 712/241 |
| 5,737,628 A | 4/1998 | Birrittella et al. | 712/11 |
| 5,740,463 A | 4/1998 | Oshima et al. | 712/11 |
| 5,752,259 A | 5/1998 | Tran | 711/125 |
| 5,765,015 A | 6/1998 | Wilkinson et al. | 712/22 |
| 5,784,602 A | 7/1998 | Glass et al. | 712/220 |
| 5,826,101 A | 10/1998 | Beck et al. | 712/34 |
| 5,832,291 A | 11/1998 | Rosen et al. | 712/11 |
| 5,867,330 A | 2/1999 | Tanaka | 360/32 |
| 5,893,148 A | 4/1999 | Genduso et al. | 711/132 |
| 5,911,082 A | 6/1999 | Monroe et al. | 712/35 |
| 5,937,202 A | 8/1999 | Crosetto | 712/19 |
| 6,003,128 A | 12/1999 | Tran | 712/241 |
| 6,023,753 A | 2/2000 | Pechanek et al. | 712/18 |
| 6,038,655 A | 3/2000 | Little et al. | 712/32 |
| 6,057,791 A | 5/2000 | Knapp | 341/122 |
| 6,081,215 A | 6/2000 | Kost et al. | 341/120 |
| 6,085,304 A | 7/2000 | Morris et al. | 712/22 |
| 6,092,183 A | 7/2000 | Takewa et al. | 712/215 |
| 6,094,030 A | 7/2000 | Gunthorpe et al. | 320/116 |
| 6,101,598 A | 8/2000 | Dokic et al. | 712/227 |
| 6,112,296 A | 8/2000 | Witt et al. | 712/222 |
| 6,145,072 A | 11/2000 | Shams et al. | 712/22 |
| 6,148,392 A | 11/2000 | Liu | 712/202 |
| 6,154,809 A | 11/2000 | Ikenaga et al. | 711/108 |
| 6,173,389 B1 | 1/2001 | Pechanek et al. | 712/24 |
| 6,178,525 B1 | 1/2001 | Warren | 714/37 |
| 6,192,388 B1 | 2/2001 | Cajolet | 718/100 |
| 6,212,628 B1 * | 4/2001 | Abercrombie et al. | 712/226 |
| 6,219,685 B1 | 4/2001 | Story | 708/498 |
| 6,223,282 B1 | 4/2001 | Kang | 712/241 |
| 6,232,905 B1 | 5/2001 | Smith et al. | 341/155 |
| 6,233,670 B1 | 5/2001 | Ikenaga et al. | 712/218 |
| 6,236,645 B1 | 5/2001 | Agazzi | 370/286 |
| 6,279,101 B1 | 8/2001 | Witt et al. | 712/215 |
| 6,307,425 B1 | 10/2001 | Chevallier et al. | 327/536 |
| 6,308,229 B1 | 10/2001 | Masteller | 710/52 |
| 6,353,880 B1 | 3/2002 | Cheng | 712/200 |
| 6,367,005 B1 | 4/2002 | Zahir et al. | 712/228 |
| 6,381,705 B1 | 4/2002 | Roche | 713/601 |
| 6,388,600 B1 | 5/2002 | Johnson et al. | 341/155 |
| 6,404,274 B1 | 6/2002 | Hosono et al. | 327/538 |
| 6,404,663 B2 | 6/2002 | Shinozaki | 365/63 |
| 6,427,204 B1 | 7/2002 | Arimilli et al. | 712/206 |
| 6,449,709 B1 | 9/2002 | Gates | 712/202 |
| 6,460,128 B1 | 10/2002 | Baxter et al. | 712/11 |
| 6,502,141 B1 | 12/2002 | Rawson, III | 713/375 |
| 6,507,947 B1 | 1/2003 | Schreiber et al. | 717/160 |
| 6,522,282 B1 | 2/2003 | Elbornsson | 341/155 |
| 6,542,105 B2 | 4/2003 | Sakuragi | 341/164 |
| 6,560,716 B1 | 5/2003 | Gasparik et al. | 713/600 |
| 6,598,148 B1 | 7/2003 | Moore et al. | 712/32 |
| 6,636,122 B2 | 10/2003 | Tsyrganovich | 331/25 |
| 6,647,027 B1 | 11/2003 | Gasparik et al. | 370/519 |
| 6,657,462 B2 | 12/2003 | Dobberpuhl | 327/108 |
| 6,665,793 B1 | 12/2003 | Zahir et al. | 712/228 |
| 6,671,112 B2 | 12/2003 | Murakami et al. | 360/39 |
| 6,725,361 B1 | 4/2004 | Rozas et al. | 712/222 |
| 6,732,253 B1 | 5/2004 | Redford | 712/22 |
| 6,782,468 B1 | 8/2004 | Nakazato | 712/9 |
| 6,825,843 B2 | 11/2004 | Allen et al. | 345/522 |
| 6,845,412 B1 | 1/2005 | Boike et al. | 710/36 |
| 6,898,721 B2 | 5/2005 | Schmidt | 713/322 |
| 6,930,628 B2 | 8/2005 | Reinhold et al. | 341/155 |
| 6,937,538 B2 | 8/2005 | Terzioglu et al. | 365/230.06 |
| 6,959,372 B1 | 10/2005 | Hobson et al. | 711/168 |
| 6,966,002 B1 | 11/2005 | Torrubia-Saez | 726/29 |
| 6,970,895 B2 | 11/2005 | Vaidyanathan et al. | 708/300 |
| 7,028,163 B2 | 4/2006 | Kim et al. | 712/202 |
| 7,079,046 B2 | 7/2006 | Tanaka | 340/870.07 |
| 7,084,793 B2 | 8/2006 | Elbornsson | 341/118 |
| 7,131,113 B2 | 10/2006 | Chang et al. | 717/128 |
| 7,136,989 B2 | 11/2006 | Ishii | 712/23 |
| 7,155,602 B2 | 12/2006 | Poznanovic | 713/1 |
| 7,162,573 B2 | 1/2007 | Mehta | 711/109 |
| 7,249,357 B2 | 7/2007 | Landman et al. | 718/102 |
| 7,255,476 B2 | 8/2007 | Franch et al. | 374/178 |
| 7,265,640 B1 | 9/2007 | Nix | 331/74 |
| 7,269,805 B1 | 9/2007 | Ansari et al. | 716/136 |
| 7,319,355 B2 | 1/2008 | Wu et al. | 327/291 |
| 7,380,100 B2 | 5/2008 | Shimura et al. | 712/15 |
| 7,386,689 B2 | 6/2008 | Kirsch | 711/154 |
| 7,403,055 B2 | 7/2008 | Minzoni | 327/175 |
| 7,528,756 B2 | 5/2009 | Moore et al. | 341/155 |
| 2002/0004912 A1 | 1/2002 | Fung | 713/300 |
| 2002/0010844 A1 | 1/2002 | Noel et al. | 711/153 |
| 2002/0019951 A1 | 2/2002 | Kubo et al. | 713/400 |
| 2002/0186159 A1 | 12/2002 | Reinhold et al. | 341/155 |
| 2003/0005168 A1 | 1/2003 | Leerssen et al. | 719/313 |
| 2003/0009502 A1 | 1/2003 | Katayanggi | 708/622 |
| 2003/0028750 A1 | 2/2003 | Hogenauer | 712/10 |
| 2003/0035549 A1 | 2/2003 | Bizjak et al. | 381/56 |
| 2003/0065905 A1 | 4/2003 | Ishii | 712/23 |
| 2003/0113031 A1 | 6/2003 | Wal | 382/260 |
| 2003/0135710 A1 | 7/2003 | Farwell et al. | 712/10 |
| 2003/0179123 A1 | 9/2003 | DeVilbiss | 341/157 |
| 2003/0217242 A1 | 11/2003 | Wybenga et al. | 711/163 |
| 2004/0003219 A1 | 1/2004 | Uehara | 712/241 |
| 2004/0030859 A1 | 2/2004 | Doerr et al. | 712/15 |
| 2004/0059895 A1 | 3/2004 | May et al. | 712/223 |
| 2004/0095264 A1 | 5/2004 | Thomas | 341/53 |
| 2004/0098707 A1 | 5/2004 | Tang et al. | 717/130 |
| 2004/0107332 A1 | 6/2004 | Fujii et al. | 712/16 |
| 2004/0143638 A1 | 7/2004 | Beckmann et al. | 709/212 |
| 2004/0215929 A1 | 10/2004 | Floyd et al. | 712/16 |
| 2004/0250046 A1 | 12/2004 | Gonzalez et al. | 712/11 |
| 2005/0015572 A1 | 1/2005 | Tanaka et al. | 712/15 |
| 2005/0027548 A1 | 2/2005 | Jacobs et al. | 705/400 |
| 2005/0034029 A1 | 2/2005 | Ramberg et al. | 714/43 |
| 2005/0114565 A1 | 5/2005 | Gonzalez et al. | 710/36 |
| 2005/0149693 A1 | 7/2005 | Barry | 712/34 |
| 2005/0182581 A1 | 8/2005 | Hashemian | 702/105 |
| 2005/0196060 A1 | 9/2005 | Wang et al. | 382/240 |
| 2005/0206648 A1 | 9/2005 | Perry et al. | 345/557 |
| 2005/0223204 A1 | 10/2005 | Kato | 712/241 |
| 2005/0228904 A1 | 10/2005 | Moore | 710/1 |
| 2005/0237083 A1 | 10/2005 | Bakker et al. | 326/47 |
| 2005/0257037 A1 | 11/2005 | Elwood et al. | 712/242 |
| 2005/0262278 A1 | 11/2005 | Schmidt | 710/62 |
| 2006/0059377 A1 | 3/2006 | Sherburne, Jr. | 713/300 |

(56) References Cited

U.S. PATENT DOCUMENTS

| | | | |
|---|---|---|---|
| 2006/0082445 A1 | 4/2006 | O'Toole et al. | 340/10.4 |
| 2006/0097901 A1 | 5/2006 | Draxelmayr et al. | 341/155 |
| 2006/0101238 A1 | 5/2006 | Bose et al. | 712/206 |
| 2006/0149925 A1 | 7/2006 | Nguyen et al. | 712/23 |
| 2006/0212867 A1 | 9/2006 | Fields et al. | 718/100 |
| 2006/0218375 A1 | 9/2006 | Swarztrauber | 712/10 |
| 2006/0224831 A1 | 10/2006 | Yoshikawa | 711/137 |
| 2006/0248317 A1 | 11/2006 | Vorbach et al. | 712/221 |
| 2006/0248360 A1 | 11/2006 | Fung | 713/300 |
| 2006/0259743 A1 | 11/2006 | Suzuoki | 712/220 |
| 2006/0271764 A1 | 11/2006 | Nilsson et al. | 712/34 |
| 2006/0279445 A1 | 12/2006 | Kinyua et al. | 341/155 |
| 2006/0279969 A1 | 12/2006 | Leung et al. | 363/41 |
| 2006/0279970 A1 | 12/2006 | Kernahan | 363/65 |
| 2007/0035611 A1 | 2/2007 | Wu | 348/14.01 |
| 2007/0036150 A1 | 2/2007 | Pounds et al. | 370/352 |
| 2007/0041438 A1 | 2/2007 | Mogi et al. | 375/232 |
| 2007/0070079 A1 | 3/2007 | Chung et al. | 345/582 |
| 2007/0113058 A1 | 5/2007 | Tran et al. | 712/241 |
| 2007/0153953 A1 | 7/2007 | Garzarolli et al. | 375/376 |
| 2007/0192646 A1 | 8/2007 | Moore | 713/323 |
| 2007/0226457 A1 | 9/2007 | Moore et al. | 712/10 |
| 2008/0270648 A1 | 10/2008 | Rible | 710/100 |

FOREIGN PATENT DOCUMENTS

| | | | | |
|---|---|---|---|---|
| EP | 0156654 | | 10/1985 | H04L 5/14 |
| EP | 0227319 | | 7/1987 | G06F 9/38 |
| EP | 0724221 | A2 | 7/1996 | G06F 15/80 |
| EP | 0992896 | | 4/2000 | G06F 9/38 |
| EP | 1182544 | | 2/2002 | G06F 9/38 |
| EP | 1821211 | | 8/2007 | G06F 9/48 |
| GB | 2154343 | A | 9/1985 | G06F 15/00 |
| GB | 2299422 | A | 10/1996 | G06F 9/44 |
| JP | 60-183645 | | 9/1985 | G06F 11/00 |
| JP | 64-012339 | | 1/1989 | G06F 9/44 |
| JP | 3-500585 | | 2/1991 | G06F 15/16 |
| JP | 03-176757 | | 7/1991 | G06F 15/16 |
| JP | 5-81216 | | 4/1993 | G06F 15/16 |
| JP | 6-243113 | | 9/1994 | G06F 15/16 |
| JP | 2509678 | | 4/1996 | G06F 15/173 |
| JP | 8-161282 | | 6/1996 | G06F 15/173 |
| JP | 2543306 | | 10/1996 | G06F 15/16 |
| JP | 8-288768 | | 11/1996 | H03G 3/02 |
| JP | 2000-181878 | | 6/2000 | G06F 15/16 |
| JP | 2003-044292 | | 2/2003 | G06F 9/46 |
| KR | 10-1999-0036970 | | 5/1999 | H03M 1/78 |
| KR | 10-2005-0112523 | | 11/2005 | G06F 9/50 |
| KR | 10-2007-0048540 | | 5/2007 | H03M 1/66 |
| KR | 10-2007-0052461 | | 5/2007 | H03M 1/66 |
| WO | 97/15001 | | 4/1997 | |
| WO | 00/42506 | | 7/2000 | G06F 9/46 |
| WO | 02/12999 | | 2/2002 | G06F 9/00 |
| WO | 02/50700 | | 6/2002 | G06F 15/78 |
| WO | 02/088936 | | 11/2002 | G06F 9/00 |
| WO | 03/019356 | | 3/2003 | G06F 9/32 |
| WO | 2005/091847 | | 10/2005 | |

OTHER PUBLICATIONS

U.S. Appl. No. 10/801,942, Office Action dated May 20, 2010.
PCT Application No. PCT/US2005/005140, International Search Report and Written Opinion dated Jun. 17, 2008.
PCT Application No. PCT/US2005/005140, International Preliminary Report on Patentability dated Mar. 5, 2009.
CN Application No. 200580008575.7, Office Action dated Mar. 15, 2010 (English translation).
EP Application No. 05723250.6, European Search Report dated Jul. 31, 2009.
EP Application No. 05723250.6, Office Action dated Mar. 19, 2010.
JP Application No. 2007-503910, Office Action dated Sep. 2, 2009 (English translation).
U.S. Appl. No. 11/810,183, Office Action dated Jun. 23, 2008.
U.S. Appl. No. 11/810,183, Office Action dated Mar. 31, 2009.
U.S. Appl. No. 11/810,183, Notice of Allowance dated Jul. 27, 2010.
PCT Application No. PCT/US2007/004031, International Search Report and Written Opinion dated Jul. 7, 2008.
PCT Application No. PCTIUS2007/004031, International Preliminary Report on Patentability dated Aug. 28, 2008.
EP Application No. 07250648.8, European Search Report dated May 21, 2007.
EP Application No. 07250648.8, Office Action dated Feb. 14, 2008.
EP Application No. 07250648.8, Office Action dated Jul. 15, 2009.
U.S. Appl. No. 11/355,513, Office Action dated Sep. 25, 2008.
U.S. Appl. No. 11/355,513, Office Action dated May 1, 2009.
U.S. Appl. No. 11/355,513, Office Action dated Dec. 28, 2009.
U.S. Appl. No. 11/355,513, Office Action dated Jul. 22, 2010.
PCT Application No. PCT/US2007/004080, International Search Report and Written Opinion dated May 5, 2008.
PCT Application No. PCT/US2007/004080, International Preliminary Report on Patentability dated Aug. 28, 2008.
CN Application No. 200780000014.1, Office Action dated Jul. 24, 2009 (English translation).
EP Application No. 07250645.4, European Search Report dated Jun. 27, 2007.
EP Application No. 07250645.4, Office Action dated Feb. 14, 2008.
P Application No. 07250645.4, Notice of Allowance dated Oct. 21, 2009.
U.S. Appl. No. 11/441,784, Restriction Requirement dated Aug. 21, 2007.
U.S. Appl. No. 11/441,784, Office Action dated Nov. 27, 2007.
U.S. Appl. No. 11/441,784, Office Action dated Feb. 19, 2008.
U.S. Appl. No. 11/441,784, Office Action dated Nov. 7, 2008.
U.S. Appl. No. 11/441,784, Interview Summary dated Nov. 9, 2009.
U.S. Appl. No. 11/441,784, Notice of Allowance dated Jan. 27, 2010.
U.S. Appl. No. 11/441,784, Office Action dated Mar. 17, 2010.
U.S. Appl. No. 11/441,784, Amendment Considered Notice dated Apr. 15, 2010.
PCT Application No. PCT/US2007/004030, International Search Report and Written Opinion dated Nov. 10, 2008.
PCT Application No. PCT/US2007/004030, International Preliminary Report on Patentability dated Dec. 18, 2008.
CN Application No. 200780000013.7, Office Action dated Mar. 30, 2010 (English translation).
EP Application No. 07250649.6, Extended European Search Report dated Jul. 2, 2007.
EP Application No. 07250649.6, Office Action dated Feb. 14, 2008.
EP Application No. 07250649.6, Office Action dated Jan. 29, 2010.
EP Application No. 07250649.6, Notice of Allowance dated Jul. 26, 2010.
U.S. Appl. No. 12/803,652, Office Action dated Sep. 22, 2010.
U.S. Appl. No. 11/441,812, Office Action dated Aug. 21, 2007.
U.S. Appl. No. 11/441,812, Restriction Requirement dated Jul. 10, 2008.
U.S. Appl. No. 11/441,812, Office Action dated Apr. 2, 2009.
U.S. Appl. No. 11/441,812, Office Action dated Jan. 15, 2010.
PCT Application No. PCT/US2007/004029, International Search Report and Written Opinion dated Aug. 25, 2008.
PCT Application No. PCT/US2007/004029, International Preliminary Report on Patentability dated Sep. 18, 2008.
CN Application No. 200780000015.6, Office Action dated Dec. 18, 2009 (English translation).
EP Application No. 07250614.0, European Search Report dated Jun. 13, 2007.
EP Application No. 07250614.0, Office Action dated Feb. 18, 2008.
EP Application No. 07250614.0, Office Action dated Jan. 29, 2010.
U.S. Appl. No. 11/441,818, Office Action dated Sep. 5, 2007.
U.S. Appl. No. 11/441,818, Office Action dated Jul. 10, 2008.
U.S. Appl. No. 11/441,818, Office Action dated Apr. 1, 2009.
U.S. Appl. No. 11/441,818, Office Action dated Jan. 5, 2010.
PCT Application No. PCT/US2007/004083, International Search Report and Written Opinion dated Sep. 4, 2008.
PCT Application No. PCT/US2007/004083, International Preliminary Report on Patentability dated Mar. 12, 2009.
EP Application No. 07250646.2, Partial European Search Report dated Jul. 24, 2007.

(56) References Cited

OTHER PUBLICATIONS

EP Application No. 07250646.2, Extended European Search Report dated Aug. 25, 2008.
EP Application No. 07250646.2, Office Action dated May 5, 2009.
U.S. Appl. No. 11/653,187, Restriction Requirement dated Oct. 24, 2008.
U.S. Appl. No. 11/653,187, Office Action dated Mar. 13, 2009.
U.S. Appl. No. 11/653,187, Office Action dated Nov. 3, 2009.
U.S. Appl. No. 11/653,187, Office Action dated Jul. 23, 2010.
PCT Application No. PCT/US2007/004082, International Search Report and Written Opinion dated Nov. 10, 2008.
PCT Application No. PCT/US2007/004082, International Preliminary Report on Patentability dated Dec. 31, 2008.
EP Application No. 07250647.0, Partial European Search Report dated Jul. 3, 2007.
EP Application No. 07250647.0, Extended European Search Report dated May 21, 2008.
EP Application No. 07250647.0, Office Action dated Jan. 9, 2009.
U.S. Appl. No. 11/741,649, Office Action dated May 12, 2008.
U.S. Appl. No. 11/741,649, Notice of Allowance dated Feb. 27, 2009.
PCT Application No. PCT/US2008/005336, International Search Report and Written Opinion dated Oct. 9, 2008.
PCT Application No. PCT/US2008/005336, International Preliminary Report on Patentability dated Dec. 28, 2009.
EP Application No. 08251505.7, European Search Report dated Aug. 4, 2008.
EP Application No. 08251505.7, Office Action dated Jul. 15, 2009.
U.S. Appl. No. 11/741,659, Office Action dated Dec. 29, 2008.
U.S. Appl. No. 11/741,659, Office Action dated Sep. 16, 2009.
U.S. Appl. No. 11/741,659, Notice of Allowance dated Jun. 9, 2010.
PCT Application No. PCT/US2008/005335, International Search Report and Written Opinion dated Dec. 8, 2008.
PCT Application No. PCT/US2008/005335, International Preliminary Report on Patentability dated May 29, 2009.
EP Application No. 08251499.3, Office Action dated Aug. 13, 2008.
EP Application No. 08251499.3, Office Action dated May 20, 2009.
Adressierungsarten und Befehlsformate (2.1.3); Flik, T.; 2 Der Mikroprozessonechnik; 2001, Springer, Berlin; ISBN: 3-540-42042-8; pp. 76-84; XP-002488692; German Translation.
A Digital Background Calibration Technique for Time-Interleaved Analog-To-Digital Converters, Daihong Fu et al.; IEEE Journal of Solid-State Circuits, vol. 33, No. 12, Dec. 1998.
Ambric's New Parallel Processor; Globally Asynchronous Eases Parallel Programming; Halfhill; Microprocessor Report, Scottsdale, AZ; Oct. 10, 2006; pp. 1-9.
An Asvnchronous Array of Simple Processors for DSP Applications; Zhiyi et al., IEEEInternational Conference Digest of Technical Papers, Feb. 6-9, 2006; pp. 1696-1705.
An Improved Dvnamic Register Array Concept for High-Performance RISC Processors; Scholz, et al.; IEEE; 1995; pp. 181-190.
An Instruction Buffer for Low-Power DSP; Brackenbury.; Advanced Research in Asynchronous Circuits and Systems, 2000 (ASYNC 2000) Proceedings, Sixth international Symposium on Eilat, Israel, Apr. 2-6, 2000; Los Alamitos, CA, USA; IEEE Comput. Soc., US; Apr. 2, 2000, pp. 176-186.
An Ultra Low-Power Processor for Sensor Networks; Ekanayake et al., V.; Sigplan Notices ACM, vol. 39, No. 11, Nov. 2004; pp. 27-36.
Analog to Digital Conversion: Technical Aspects; Loumeau et al.; Annales des Telecommunications, vol. 57, Nos. 5-6; Jun. 3, 2002; pp. 338-385.
Analog/RF Circuit Design Techniques for Nanometerscale IC Technologies; Nauta et al.; Proceedings of the 31 st European Solid-State Circuits Conf, 2005; Sep. 12, 2005; pp. 45-53.
ASPRO-216: A Standard-Cell Q.DJ. 16-Bit RISC Asvnchronous Microprocessor; Renaudin et al.;Proceedings. International Symposium on Advanced Research in Asychronous Circuits and Systems; Jan. 1, 1989, pp. 2231.
BitSNAP: Dynamic Significance Compression for a Low-Energy Sensor Network IAsynchronous Processor; Ekanayake et al., V.N.; Asynchronous Circuits & Systems, Mar. 14-16, 2005; pp. 144-154.
B16—Ein Forth Prozessor im FPGA; Paysan; INET (Online); Feb. 2, 2003, XP002490986; Retreived from the Internet: url:http://www.jwdt.com/{paysan/bl6.pdf> p. 1.
C18 Colorforth Compiler; Chuck Moore; EVROFORTH 2001 (Online); Nov. 26, 2001 , XP002490985, Schloss Dagstuhl, Saarland, Germany; Retreived from the Internet: url: http ://www.complang.tuwien.ac.at/anton/euroforth/ef01/moore01a.pdf> pp. 1.
Capturing Data from Gigasample Analog-to-Digital Converters; King, I/O Magazine; Jan. 2006.
Computer Architecture: a Quantitative Approach; Hennessy et al., Morgan KaufmannPublishers, 3rd Edition, 2003; pp. 98.
COMS Digital Integrated Circuits, Kang et al., 1999, McGraw-Hill, 2nd edition, pp. 549-550.
Connection Machine Model CM-5 System Overview; Palmer et al., Thinking Machine Corp., Cambridge, Mass., IEEE Jul. 1992, pp. 474-483.
Datawave: A Single-Chip Multiprocessor for Video Applications; Schmidt et al.; IEEE Micro, IEEE Service Center, Los Alamitos, CA; vol. 11, No. 3, Jun. 1, 1991; pp. 22-25, 88.
Design of a High-Performance Analog-to-Digital Converter; Nary, Kevin; Publication date unknown.
Energy Characterization of a Tiled Architecture Processor with On-Chip Networks; Kim, J.S.; Proceedings of the 2003 International Symposium on Low Power Electronics & Design, Aug. 25-27, 2003; pp. 424-427.
Evolvable Platform for Array Processing: A One-Chip Approach, Girau et al., Microelectronics for Neural, Fuzzy and Bio-Inspired Systems, 1999. MIC Roneuro '99. Proceedings of the Seventh International Conference on Granada, Spain, Apr. 7-9, 1999,Los Alamitos, CA(US) IEEE Computer Soc, US, Apr. 7, 1999, pp. 187-193, XP010329509.
Field Programmable Processor Arrays, Nussbaum et al., Evolvable Systems: From Biology to Hardware. Second International Conference, ICES 98 Proceedings, Springer-Verlag, Berlin, DE, 1998, pp. 311-322, XP002536744.
Flits: Pervasive Computing for Processor and Memory Constrained Systems, Majurski et al., NIST, pp. 31-38; not dated.
Forth Session—The Evolution of Forth, Rather et al., Sigplan Notices USA, vol. 28, No. 3, Mar. 1993, pp. 177-199.
Functionally Asynchronous Array Processor for Morphological Filtering of Grayscale Images;Robin et al., IEEE Proceedings: Computers and Digital Techniques, vol. 143, No. 5, Sep. 24, 1996; pp. 273-281.
IEEE Standard for Boot (Initialization Configuration) Firmware: Core Requirementsand Practices, IEEE Std 1275; 1994.
Introduction to Java's Architecture, Venners, Artima.com; Jan. 8, 1999, pp. 1-10.
Itanium Processor Microarchitecture, Sharangpani, H. et al.: IEEE; 2000; pp. 24-43.
iWarp: A 100-MPOS, LIW Microprocessor for Multicomputers, Peterson et al.; IEEE Micro; IEEE Service Center, Los Alamitos, CA; vol. 11, No. 3, Jun. 1, 1991; pp. 26-29, 81-87.
Low-Power Electronics Design, Piguet, CRC Press, 2005, pp. 7-1-7-18 (Logic Circuits & Standard Cells—Chapter 7).
M68HC11 Microcontrollers Reference Manual, Motorola, Rev.6, Apr. 2002,pp. 29-31, 46, 203,234, 549.
Mikroprozessortechnik-, Flik, 2001, Springer Verlag, Berlin, pp. 528-533, figures 8-5a, ISBN: 3-540-42042-8; German Translation.
Performance and Power Analysis of Globally Asynchronous Locally Synchronous Multi-Processor Systems, Zhiyi Yu et al., Emerging VLSI Technologies and Architectures, 2006. IEEE Computer Society Annual Symposium on Klarlsruhe, Germany, Mar. 2-3, 2006, Piscataway, NJ, USA, IEEE, Mar 2, 2006 pp. 378-383.
Stack Computers, The New Wave; Koopman, Jr., Phillip; Mountain View Press, La Honda, CA; 1989.
Teilzeitarbeit im Prozessor; Frees, W.; Electronik, WEKA Fachzeitschriftenverlag, Poing, DE, vol. 45, No. 9, Apr. 30, 1996; pp. 100-106; German Translation.
The Architecture of the SC32 Forth Engine; Hayes et al.; Journal of Forth Application and Research, Institute for Applied Forth Research; Rochester, US; vol. 5, No. 4, 1989, pp. 493-506 (pp. 500-501 Fig 3).

(56) References Cited

OTHER PUBLICATIONS

The Computer Engineering Handbook; Oklobdzija, CRC Press, 2002; Chapter 7:Architectures for Low Power; (XP-002437796).
The Evolution Of Forth; Rather et al; ACM SIGPLAN Notices, vol. 28, No. 3, Mar. 1993.
The PASM Project: A Study of Reconfigurable Parallel Computing; Siegel et al., Parallel Architectures, Algorithms and Networks, Jun. 12-14, 1996; pp. 529-536.
The Raw Microprocessor: A Computational Fabric for Software Circuits & General-Purpose Programs; Agarwal et al.; IEEE Micro, IEEE Service Center, vol. 22, No. 2, Mar. 2002; pp. 25-35.
Use IRAM For Rasterization, Kang Yet al., Image Processing, 1998, ICIP 98. Proceedings. 1998; International Conference on Chicago, IL, USA. Oct. 4-7, 1998, Los Alamitos, CA, USA, IEEE Comput. Soc. US, vol. 3, Oct. 4, 1998, pp. 1010-1013.
VBScript Looping Statements; W3Schools; www.w3schools.com/vbscript/vbsript_looping.asp; Jul. 2000.
White Paper on Parallel Successive Approximation ADC; Elbornsson, PhD., MathCore Engineering AB; Oct. 18, 2005.
8Xc251SB Embedded Microcontroller User's Manual, Intel, Feb. 1995, pp. 1-9,9-438, and sections 9-1 to 9-4.
U.S. Appl. No. 10/801,942, Office Action dated May 15, 2006.
U.S. Appl. No. 10/801,942, Office Action dated Jan. 29, 2007.
U.S. Appl. No. 10/801,942, Office Action dated Aug. 8, 2007.
U.S. Appl. No. 10/801,942, Interview Summary dated Nov. 14, 2007.
U.S. Appl. No. 10/801,942, Office Action dated Jun. 19, 2008.

* cited by examiner

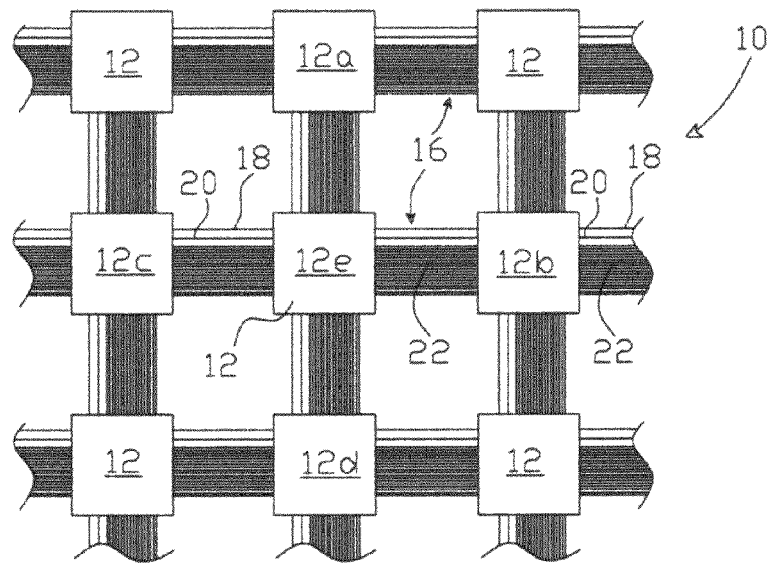
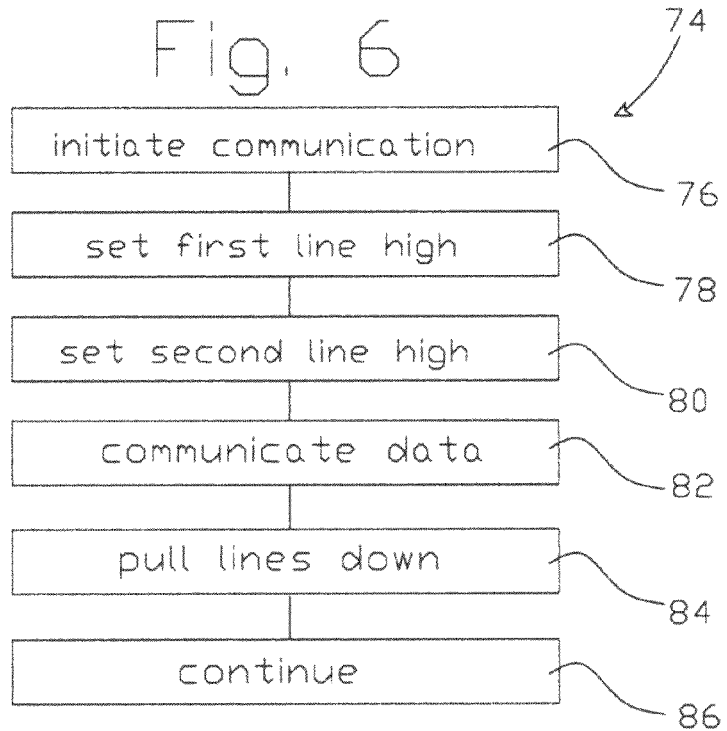

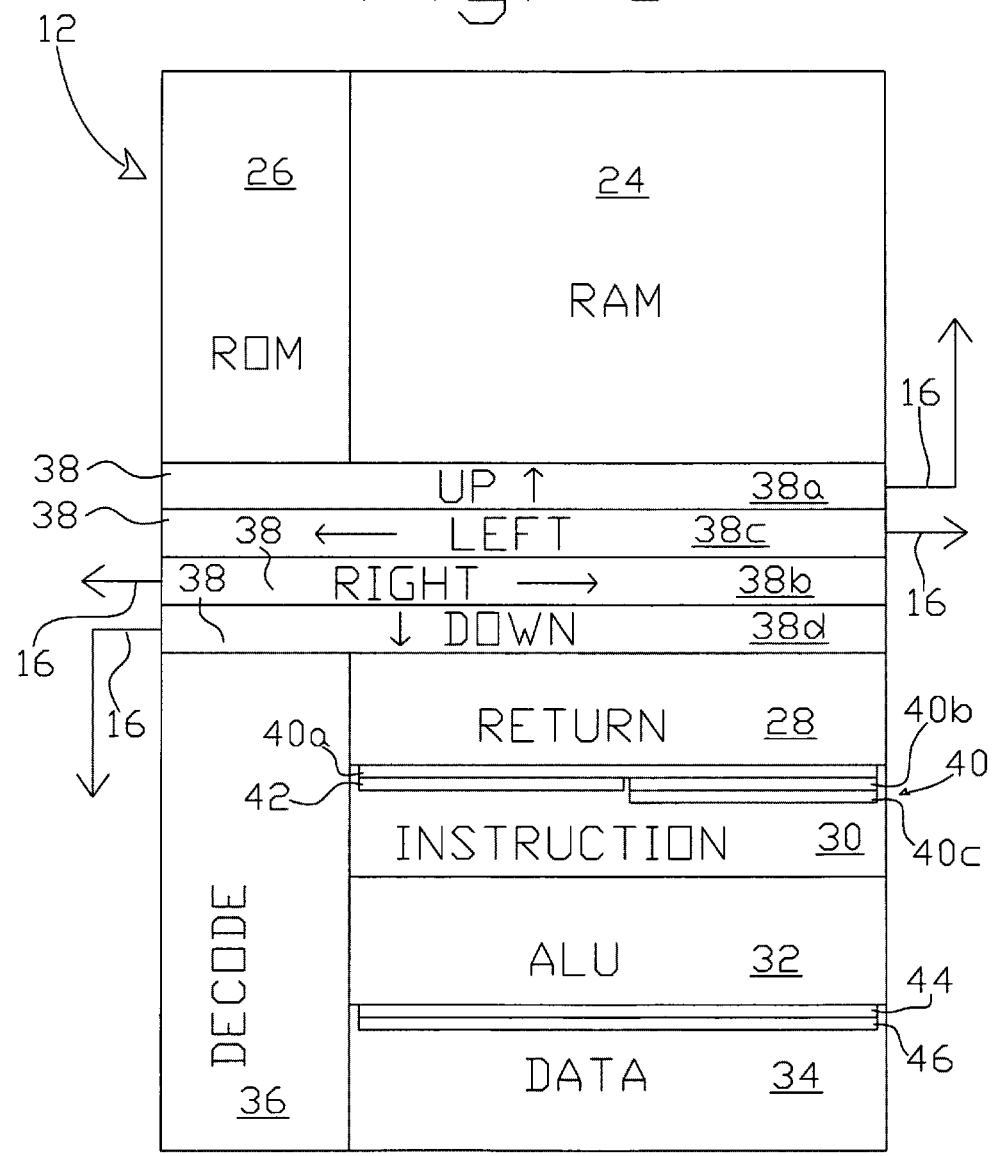

ASYNCHRONOUS COMPUTER COMMUNICATION

RELATED APPLICATIONS

This application is a continuation of U.S. patent application Ser. No. 11/355,495 (now U.S. Pat. No. 7,904,615) filed Feb. 16, 2006 by the same inventor, which is incorporated herein by reference in its entirety.

BACKGROUND OF THE INVENTION

1. Field of the Invention

The present invention relates to the field of computers and computer processors, and more particularly to a method and means for configuring individual computers and further for connecting the computers together such that the overall speed and, more particularly, the efficiency of the combination is optimized. The predominant current usage of the present inventive computer array is in the combination of multiple computers on a single microchip, wherein both computing power and power consumption are important considerations.

2. Description of the Background Art

In the art of computing, processing speed is a much desired quality, and the quest to create faster computers and processors is ongoing. However, it is generally acknowledged in the industry that the limits for increasing the speed in microprocessors are rapidly being approached, at least using presently known technology. Therefore, there is an increasing interest in the use of multiple processors to increase overall computer speed by sharing computer tasks among the processors. But it is also generally acknowledged that there will, almost inevitably, be some decrease in overall efficiency involved in the sharing of the workload. That is, the old adage will apply that just because one person can dig a post hole in 60 minutes, it does necessarily follow that 60 people could dig a post hole in 1 minute. The same principle applies to almost any division of tasks, and the division of tasks among processors is no exception.

Of course, efforts are being made to make the sharing of tasks among computer processors more efficient. The question of exactly how the tasks are to be allocated is being examined and processes improved. However, no one expects that there will not be at least some "wasted" processor power in such an arrangement, no matter how clever might be the implementation.

The lack of a high level of efficiency in multiple processor computers is not necessarily a great hindrance to the overall computing capabilities of the computer chip or system. Lack of efficiency can generally be easily overcome by the sheer brute increase in available processors and processing capacity. However this solution leads to another problem. That is, so many processors and associated components create an ever increasing amount of heat. Heat is already a problem even with today's high power single processor computer chips. They need extraordinary cooling means, such as fans and even water cooling, just to operate normally. Therefore, it has become practically impossible to use the more powerful single processors in small handheld devices, small application specific digital equipment, and the like. The idea of combining multiple processors of the type typically in use today on a single chip would seem to be beyond the physical limits of the package to dissipate the generated heat, even using the most extraordinary means of assistance.

The heat problem discussed above is well known in the industry. Great effort is being made to address the problem. Proposed solutions have included methods for improving efficiency and thereby reducing the number and size of processors needed, and methods for reducing the power consumption of individual processors. However, it is generally recognized that the ultimate solution to this problem has yet to be found. The problem is further compounded by the trend in the industry to apply such processors to small hand held devices. The heat dissipation problem is difficult enough in larger computer packages, but it seems almost insurmountable when the size and inherent lack of heat dissipation surfaces in very small devices is considered. Also, power consumption problems go hand in hand with heat production problems. Obviously, wasted heat production means wasted power consumption. This is always undesirable, but in small battery powered devices it is unacceptable.

Clearly, it would be advantageous to find a way to provide a great amount of computing capacity without consuming a great deal of power or creating a great deal of heat. However, to the inventor's knowledge, no satisfactory solution has been known prior to the present invention.

SUMMARY

Accordingly, it is an object of the present invention to provide an apparatus and method for increasing computer processing speed.

It is still another object of the present invention to provide an apparatus and method for providing substantial computing power inexpensively.

It is yet another object of the present invention to provide an apparatus and method for increasing the operational speed of a multi-computer array.

It is still another object of the present invention to provide an apparatus and method for accomplishing computationally intensive tasks.

It is yet another object of the present invention to provide a computer device that produces a great amount of processing capability without consuming a great amount of power.

It is still another object of the present invention to provide a computer device that produces a great amount of processing power without creating a great amount of heat.

Briefly, a known embodiment of the present invention is an array of computers, each computer having its own memory and being capable of independent computational functions. In order to accomplish tasks cooperatively, the computers must pass data and/or instructions from one to another. Since all of the computers working simultaneously will typically provide much more computational power than is required by most tasks, and since whatever algorithm or method that is used to distribute the task among the several computers will almost certainly result in an uneven distribution of assignments, it is anticipated that at least some, and perhaps most, of the computers will not be actively participating in the accomplishment of the task at any given time. In order to prevent unnecessary consumption of power and unnecessary production of heat, when a computer attempts to communicate with one or more of its neighbors it will be in a dormant mode consuming essentially no power until the neighbor or one of the neighbors acts to complete the communication.

As described herein, the communication between the computers is asynchronous in that it is not timed by any clock, or the like. Rather, it is both begun and completed as the resources become available. That is, a computer will either initiate the sending of data or else place itself in a state ready to receive data when its programming directs it to do so. Then, when the computer, or one of selected computers, with which it is attempting to communicate becomes ready to complete the communication, it does so.

In order to accomplish the desired savings of power and reduced heat dissipation it is desirable that the initiating computer cease, or at least significantly reduce, its power consumption while it is awaiting completion of the communication. It is conceivable that this could be accomplished by any of a number of means. For example, if the computer were timed by either an internal or an external clock, then that clock could be slowed or stopped during that period of time. However, according to the embodiment of the invention described herein, the computers are, themselves, operating asynchronously internally. That is, there is no clock type signal driving the computers (with one exception discussed herein). It is the natural condition of such an asynchronous device to stop in a state wherein essentially no power (except that consumed by a small amount of leakage current) is used while the computer is awaiting a next operation.

According to the present invention, complete asynchronous operation between computers is effected through the use of an acknowledge operation. That is, in the prior art, wherein communications are clocked, communications between devices is generally assumed to have occurred at a particular time relative to the clocking signal. A sending computer would generally not have any immediate positive feedback to confirm that its data is received by a receiving computer. However, according to the present invention, when one computer attempts communication, either by attempting to send or attempting to receive, and then subsequently another computer completes that operation, either by receiving or by sending, the sending computer's action is acknowledged by the receiving computer such that both computers know that the transaction is completed. In the present embodiment of the invention, this acknowledgement is accomplished by bringing control lines low such that data cycles, or time, is not wasted in accomplishing the acknowledge operation. However, the inventor believes that the operation of acknowledging the completion of a communication is applicable to essentially any asynchronous communication between devices, whether those devices be inherently internally asynchronous or not, and further even whether they might be based on conventional electronic circuitry, molecular principles, or any other principle of operation now in existence or to be developed in the future.

These and other objects and advantages of the present invention will become clear to those skilled in the art in view of the description of modes of carrying out the invention, and the industrial applicability thereof, as described herein and as illustrated in the several figures of the drawing. The objects and advantages listed are not an exhaustive list of all possible advantages of the invention. Moreover, it will be possible to practice the invention even where one or more of the intended objects and/or advantages might be absent or not required in the application.

Further, those skilled in the art will recognize that various embodiments of the present invention may achieve one or more, but not necessarily all, of the described objects and/or advantages. Accordingly, the objects and/or advantages described herein are not essential elements of the present invention, and should not be construed as limitations.

BRIEF DESCRIPTION OF THE DRAWINGS

FIG. 2 is a detailed diagram showing a subset of the computers of FIG. 1 and a more detailed view of the interconnecting data buses of FIG. 1;

FIG. 3 is a block diagram depicting a general layout of one of the computers of FIGS. 1 and 2;

FIG. 6 is a flow diagram depicting an example of the present inventive method.

DETAILED DESCRIPTION OF THE INVENTION

Figure 1:
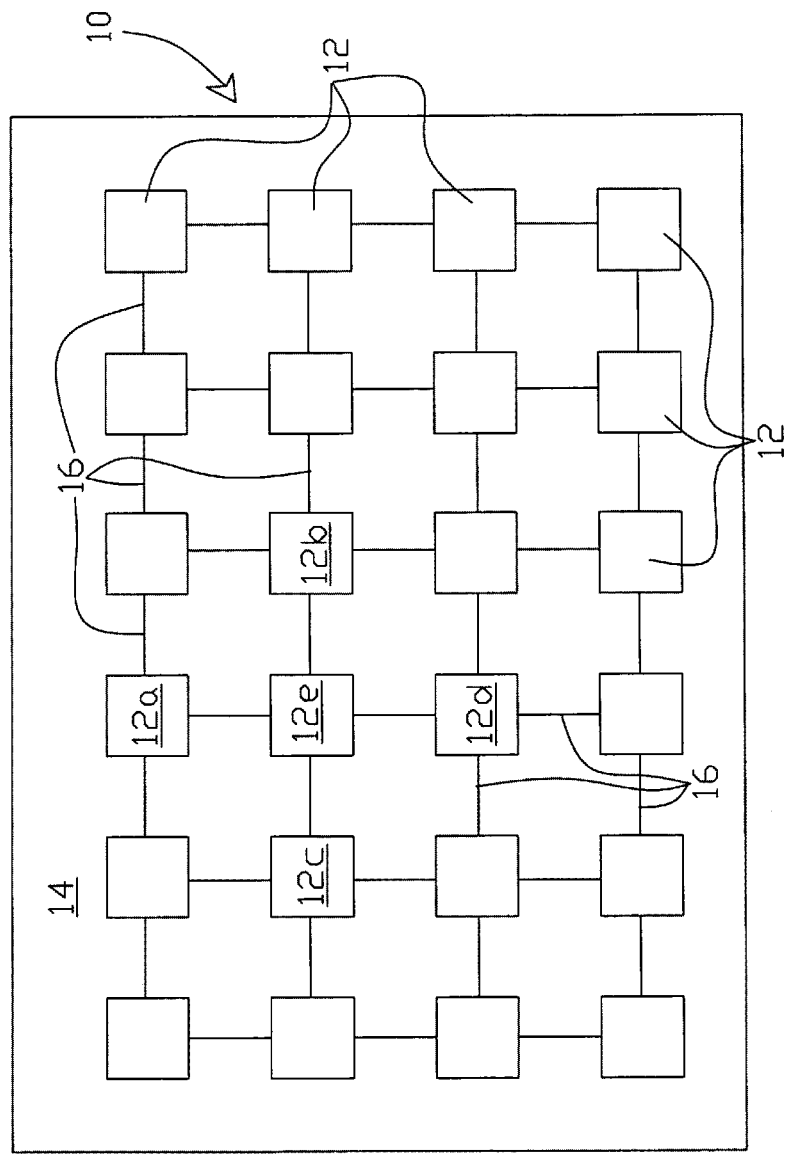
FIG. 1 is a diagrammatic view of a computer array, according to one embodiment of the present invention.

This invention is described in the following description with reference to the Figures, in which like numbers represent the same or similar elements. While this invention is described in terms of modes for achieving this invention's objectives, it will be appreciated by those skilled in the art that variations may be accomplished in view of these teachings without deviating from the spirit or scope of the present invention.

The embodiments and variations of the invention described herein, and/or shown in the drawings, are presented by way of example only and are not limiting as to the scope of the invention. Unless otherwise specifically stated, individual aspects and components of the invention may be omitted or modified, or may have substituted therefore known equivalents, or as yet unknown substitutes such as may be developed in the future or such as may be found to be acceptable substitutes in the future. The invention may also be modified for a variety of applications while remaining within the spirit and scope of the claimed invention, since the range of potential applications is great, and since it is intended that the present invention be adaptable to many such variations.

A known mode for carrying out the invention is an array of individual computers. The inventive computer array is depicted in a diagrammatic view in FIG. 1 and is designated therein by the general reference character 10. The computer array 10 has a plurality (twenty-four in the example shown) of computers 12 (sometimes also referred to as "cores" or "nodes" in the example of an array). In the example shown, all of the computers 12 are located on a single die 14. According to the present invention, each of the computers 12 is a generally independently functioning computer, as will be discussed in more detail hereinafter. The computers 12 are interconnected by a plurality (the quantities of which will be discussed in more detail hereinafter) of interconnecting data buses 16. In this example, the data buses 16 are bidirectional asynchronous high speed parallel data buses, although it is within the scope of the invention that other means for interconnecting and communicating between computers might be employed for the purpose. In the present embodiment of the array 10, not only is data communication between the computers 12 asynchronous, the individual computers 12 also operate in an internally asynchronous mode. This has been found by the inventor to provide important advantages. For example, since a clock signal does not have to be distributed throughout the computer array 10, a great deal of power is saved. Furthermore, not having to distribute a clock signal eliminates many timing problems that could limit the size of the array 10 or cause other known difficulties.

One skilled in the art will recognize that there will be additional components on the die 14 that are omitted from the view of FIG. 1 for the sake of clarity. Such additional components include power buses, external connection pads, and other such common aspects of a microprocessor chip.

Computer 12e is an example of one of the computers 12 that is not on the periphery of the array 10. That is, computer 12e has four orthogonally adjacent computers 12a, 12b, 12c and 12d. This grouping of computers 12a through 12e will be used hereinafter in relation to a more detailed discussion of the communications between the computers 12 of the array 10. As can be seen in the view of FIG. 1, interior computers such as computer 12e will have four other computers 12 with which they can directly communicate via the buses 16. In the following discussion, the principles discussed will apply to all of the computers 12 except that the computers 12 on the periphery of the array 10 will be in direct communication with only three or, in the case of the corner computers 12, only two other of the computers 12.

FIG. 2 is a more detailed view of a portion of FIG. 1 showing only some of the computers 12 and, in particular, computers 12a through 12e, inclusive. The view of FIG. 2 also reveals that the data buses 16 each have a read line 18, a write line 20 and a plurality (eighteen, in this example) of data lines 22. The data lines 22 are capable of transferring all the bits of one eighteen-bit instruction word generally simultaneously in parallel. It should be noted that, in one embodiment of the invention, some of the computers 12 are mirror images of adjacent computers. However, whether the computers 12 are all oriented identically or as mirror images of adjacent computers is not an aspect of this presently described invention. Therefore, in order to better describe this invention, this potential complication will not be discussed further herein.

According to the present inventive method, a computer 12, such as the computer 12e can set one, two, three or all four of its read lines 18 such that it is prepared to receive data from the respective one, two, three or all four adjacent computers 12. Similarly, it is also possible for a computer 12 to set one, two, three or all four of its write lines 20 high. Although the inventor does not believe that there is presently any practical value to setting more than one of a computer's 12 write lines 20 high at one time, doing so is not beyond the scope of this invention, as it conceivable that a use for such an operation may occur. The read lines 18 and the write lines 20, and the signals asserted on the lines 18 and 20, provide means for a computer 12 to indicate that it is ready to communicate with another computer.

When one of the adjacent computers 12a, 12b, 12c or 12d sets a write line 20 between itself and the computer 12e high, if the computer 12e has already set the corresponding read line 18 high, then a word is transferred from that computer 12a, 12b, 12c or 12d to the computer 12e on the associated data lines 22. Then the sending computer 12 will release the write line 20 and the receiving computer (12e in this example) pulls both the write line 20 and the read line 18 low. The latter action will acknowledge to the sending computer 12 that the data has been received. Note that the above description is not intended necessarily to denote the sequence of events in order. In actual practice, in this example the receiving computer may try to set the write line 20 low slightly before the sending computer 12 releases (stops pulling high) its write line 20. In such an instance, as soon as the sending computer 12 releases its write line 20 the write line 20 will be pulled low by the receiving computer 12e.

In the present example, only a programming error would cause both computers 12 on the opposite ends of one of the buses 16 to try to set high the read line 18 therebetween. Also, it would be error for both computers 12 on the opposite ends of one of the buses 16 to try to set high the write line 20 there-between at the same time. Similarly, as discussed above, it is not currently anticipated that it would be desirable to have a single computer 12 set more than one of its four write lines 20 high. However, it is presently anticipated that there will be occasions wherein it is desirable to set different combinations of the read lines 18 high such that one of the computers 12 can be in a wait state awaiting data from the first one of the chosen computers 12 to set its corresponding write line 20 high.

In the example discussed above, computer 12e was described as setting one or more of its read lines 18 high before an adjacent computer (selected from one or more of the computers 12a, 12b, 12c or 12d) has set its write line 20 high. However, this process can certainly occur in the opposite order. For example, if the computer 12e were attempting to write to the computer 12a, then computer 12e would set the write line 20 between computer 12e and computer 12a to high. If the read line 18 between computer 12e and computer 12a has then not already been set to high by computer 12a, then computer 12e will simply wait until computer 12a does set that read line 18 high. Then, as discussed above, when both of a corresponding pair of write line 20 and read line 18 are high the data awaiting to be transferred on the data lines 22 is transferred. Thereafter, the receiving computer 12 (computer 12a, in this example) sets both the read line 18 and the write line 20 between the two computers (12e and 12a in this example) to low as soon as the sending computer 12e releases it.

Whenever a computer 12 such as the computer 12e has set one of its write lines 20 high in anticipation of writing it will simply wait, using essentially no power, until the data is "requested", as described above, from the appropriate adjacent computer 12, unless the computer 12 to which the data is to be sent has already set its read line 18 high, in which case the data is transmitted immediately. Similarly, whenever a computer 12 has set one or more of its read lines 18 to high in anticipation of reading it will simply wait, using essentially no power, until the write line 20 connected to a selected computer 12 goes high to transfer an instruction word between the two computers 12.

There may be several potential means and/or methods to cause the computers 12 to function as described above. However, in this present example, the computers 12 so behave simply because they are operating generally asynchronously internally (in addition to transferring data there-between in the asynchronous manner described). That is, instructions are completed sequentially. When either a write or read instruction occurs, there can be no further action until that instruction is completed (or, perhaps alternatively, until it is aborted, as by a "reset" or the like). There is no regular clock pulse, in the prior art sense. Rather, a pulse is generated to accomplish a next instruction only when the instruction being executed either is not a read or write type instruction (given that a read or write type instruction would require completion by another entity) or else when the read or write type operation is, in fact, completed.

FIG. 3 is a block diagram depicting the general layout of an example of one of the computers 12 of FIGS. 1 and 2. As can be seen in the view of FIG. 3, each of the computers 12 is a generally self contained computer having its own RAM 24 and ROM 26. As mentioned previously, the computers 12 are also sometimes referred to as individual "cores", given that they are, in the present example, combined on a single chip.

Other basic components of the computer 12 are a return stack 28, an instruction area 30, an arithmetic logic unit ("ALU") 32, a data stack 34 and a decode logic section 36 for decoding instructions. One skilled in the art will be generally familiar with the operation of stack based computers such as the computers 12 of this present example. The computers 12 are dual stack computers having the data stack 34 and separate return stack 28.

In this embodiment of the invention, the computer 12 has four communication ports 38 for communicating with adjacent computers 12. The communication ports 38 are tri-state drivers, having an off status, a receive status (for driving signals into the computer 12) and a send status (for driving signals out of the computer 12). Of course, if the particular computer 12 is not on the interior of the array (FIG. 1) such as the example of computer 12e, then one or more of the communication ports will not be used in that particular computer, at least for the purposes described herein. The instruction area 30 includes a number of registers 40 including, in this example, an A register 40a, a B register 40b and a P register 40c. In this example, the A register 40a is a full eighteen-bit register, while the B register 40b and the P register 40c are nine-bit registers.

Although the invention is not limited by this example, the present computer 12 is implemented to execute native Forth language instructions. As one familiar with the Forth computer language will appreciate, complicated Forth instructions, known as Forth "words" are constructed from the native processor instructions designed into the computer. The collection of Forth words is known as a "dictionary". In other languages, this might be known as a "library". As will be described in greater detail hereinafter, the computer 12 reads eighteen bits at a time from RAM 24, ROM 26 or directly from one of the data buses 16 (FIG. 2). However, since in Forth most instructions (known as operand-less instructions) obtain their operands directly from the stacks 28 and 34, they are generally only five bits in length such that up to four instructions can be included in a single eighteen-bit instruction word, with the condition that the last instruction in the group is selected from a limited set of instructions that require only three bits. Also depicted in block diagrammatic form in the view of FIG. 3 is a slot sequencer 42. In this embodiment of the invention, the top two registers in the data stack 34 are a T register 44 and an S register 46.

Figure 4:
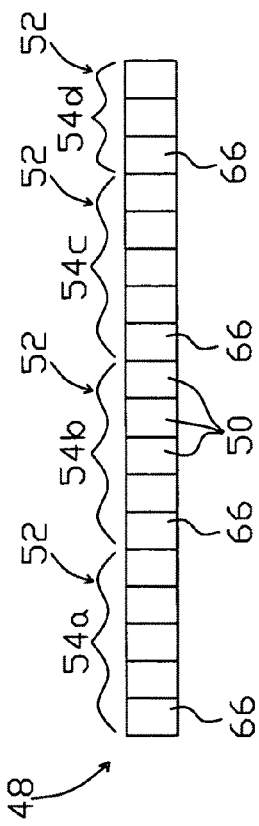
FIG. 4 is a diagrammatic representation of an instruction word according to the present inventive application.

FIG. 4 is a diagrammatic representation of an instruction word 48. (It should be noted that the instruction word 48 can actually contain instructions, data, or some combination thereof.) The instruction word 48 consists of eighteen bits 50. This being a binary computer, each of the bits 50 will be a '1' or a '0'. As previously discussed herein, the eighteen-bit wide instruction word 48 can contain up to four instructions 52 in four slots 54 called slot zero 54a, slot one 54b, slot two 54c and slot three 54d. In the present embodiment of the invention, the eighteen-bit instruction words 48 are always read as a whole. Therefore, since there is always a potential of having up to four instructions in the instruction word 48, a no-op (no operation) instruction is included in the instruction set of the computer 12 to provide for instances when using all of the available slots 54 might be unnecessary or even undesirable. It should be noted that, according to one particular embodiment of the invention, the polarity (active high as compared to active low) of bits 50 in alternate slots (specifically, slots one 54b and three 54c) is reversed. However, this is not a necessary aspect of the presently described invention and, therefore, in order to better explain this invention this potential complication is avoided in the following discussion.

Figure 5:
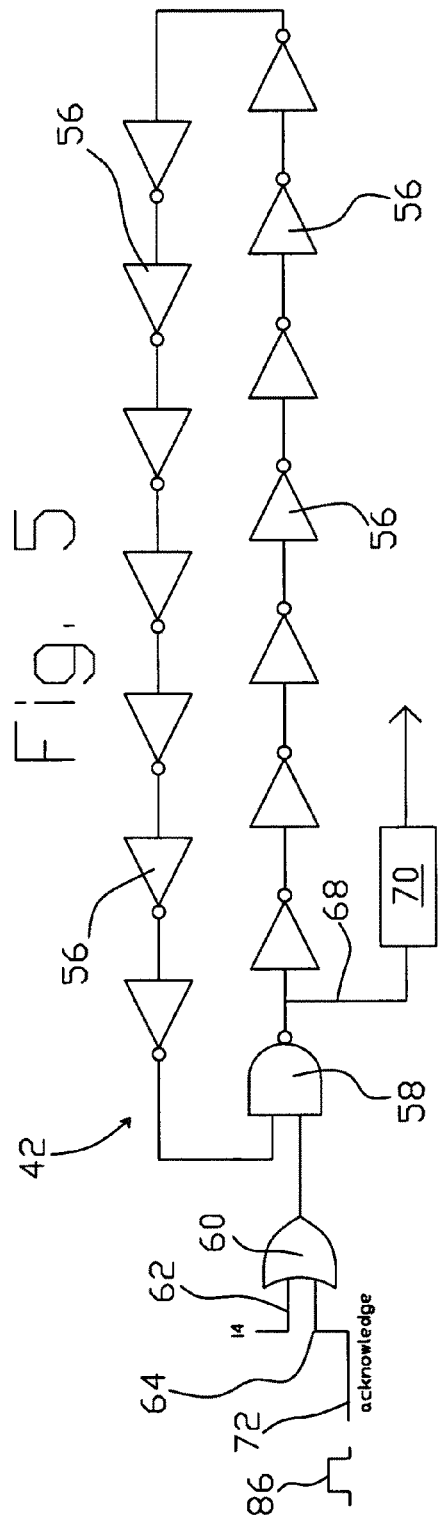
FIG. 5 is a schematic representation of the slot sequencer 42 of FIG. 3.

FIG. 5 is a schematic representation of the slot sequencer 42 of FIG. 3. As can be seen in the view of FIG. 5, the slot sequencer 42 has a plurality (fourteen in this example) of inverters 56 and one NAND gate 58 arranged in a ring, such that a signal is inverted an odd number of times as it travels through the fourteen inverters 56 and the NAND gate 58. A signal is initiated in the slot sequencer 42 when either of the two inputs to an OR gate 60 goes high. A first OR gate input 62 is derived from a bit i4 66 (FIG. 4) of the instruction 52 being executed. If bit i4 is high then that particular instruction 52 is an ALU instruction, and the i4 bit 66 is '1'. When the i4 bit is '1', then the first OR gate input 62 is high, and the slot sequencer 42 is triggered to initiate a pulse that will cause the execution of the next instruction 52.

When the slot sequencer 42 is triggered, either by the first OR gate input 62 going high or by the second OR gate input 64 going high (as will be discussed hereinafter), then a signal will travel around the slot sequencer 42 twice, producing an output at a slot sequencer output 68 each time. The first time the signal passes the slot sequencer output 68 it will be low, and the second time the output at the slot sequencer output 68 will be high. The relatively wide output from the slot sequencer output 68 is provided to a pulse generator 70 (shown in block diagrammatic form) that produces a narrow timing pulse as an output. One skilled in the art will recognize that the narrow timing pulse is desirable to accurately initiate the operations of the computer 12.

When the particular instruction 52 being executed is a read or a write instruction, or any other instruction wherein it is not desired that the instruction 52 being executed triggers immediate execution of the next instruction 52 in sequence, then the i4 bit 66 is '0' (low) and the first OR gate input 62 is, therefore, also low. One skilled in the art will recognize that the timing of events in a device such as the computers 12 is generally quite critical, and this is no exception. Upon examination of the slot sequencer 42 one skilled in the art will recognize that the output from the OR gate 60 must remain high until after the signal has circulated past the NAND gate 58 in order to initiate the second "lap" of the ring. Thereafter, the output from the OR gate 60 will go low during that second "lap" in order to prevent unwanted continued oscillation of the circuit.

As can be appreciated in light of the above discussion, when the i4 bit 66 is '0', then the slot sequencer 42 will not be triggered—assuming that the second OR gate input 66, which will be discussed hereinafter, is not high.

As discussed, above, the i4 bit 66 of each instruction 52 is set according to whether or not that instruction is a read or write type of instruction. The remaining bits 50 in the instruction 52 provide the remainder of the particular opcode for that instruction. In the case of a read or write type instruction, one or more of the bits may be used to indicate where data is to be read from or written to in that particular computer 12. In the present example of the invention, data to be written always comes from the T register 44 (the top of the data stack 34), however data can be selectively read into either the T register 44 or else the instruction area 30 from where it can be executed. That is because, in this particular embodiment of the invention, either data or instructions can be communicated in the manner described herein and instructions can, therefore, be executed directly from the data bus 16, although this is not a necessary aspect of this present invention. Furthermore, one or more of the bits 50 will be used to indicate which of the ports 38, if any, is to be set to read or write. This later operation is optionally accomplished by using one or more bits to designate a register 40, such as the A register 40a, the B register, or the like. In such an example, the designated register 40 will be preloaded with data having a bit corresponding to each of the ports 38 (and, also, any other potential entity with which the computer 12 may be attempting to communicate, such as memory, an external communications port, or the like.) For example, each of four bits in the particular register 40 can correspond to each of the up port 38a, the right port 38b, the left port 38c or the down port 38d. In such case, where there is a '1' at any of those bit locations, communication will be set to proceed through the corresponding port 38. As previously discussed herein, in the present embodiment of the invention it is anticipated that a read opcode might set more than one port 38 for communication in a single instruction while, although it is possible, it is not anticipated that a write opcode will set more than one port 38 for communication in a single instruction.

The immediately following example will assume a communication wherein computer 12e is attempting to write to computer 12c, although the example is applicable to communication between any adjacent computers 12. When a write instruction is executed in a writing computer 12e, the selected write line 20 (in this example, the write line 20 between computers 12e and 12c) is set high. If the corresponding read line 18 is already high, then data is immediately sent from the selected location through the selected communications port 38. Alternatively, if the corresponding read line 18 is not already high, then computer 12e will simply stop operation until the corresponding read line 18 does go high. The mechanism or means for stopping (or, more accurately, not enabling further operations of) the computer 12a when there is a read or write type instruction has been discussed previously herein. In short, the opcode of the instruction 52 will have a '0' at bit position i4 66, and so the first OR gate input 62 of the OR gate 60 is low, and so the slot sequencer 42 is not triggered to generate an enabling pulse.

As for how the operation of the computer 12e is resumed when a read or write type instruction is completed, the mechanism for that is as follows: When both the read line 18 and the corresponding write line 20 between computers 12e and 12c are high, then both lines 18 and 20 will be released by each of the respective computers 12 that is holding it high. (In this example, the sending computer 12e will be holding the write line 18 high while the receiving computer 12c will be holding the read line 20 high). Then the receiving computer 12c will pull both lines 18 and 20 low. In actual practice, the receiving computer 12c may attempt to pull the lines 18 and 20 low before the sending computer 12e has released the write line 18. However, since the lines 18 and 20 are pulled high and only weakly held (latched) low, any attempt to pull a line 18 or 20 low will not actually succeed until that line 18 or 20 is released by the computer 12 that is latching it high.

When both lines 18 and 20 in a data bus 16 are pulled low, this is an "acknowledge" condition, or in other words, means for acknowledging that a communication has been accomplished. Each of the computers 12e and 12c will, upon the acknowledge condition, set its own internal acknowledge line 72 high. As can be seen in the view of FIG. 5, the acknowledge line 72 provides the second OR gate input 64. Since an input to either of the OR gate 60 inputs 62 or 64 will cause the output of the OR gate 60 to go high, this will initiate operation of the slot sequencer 42 in the manner previously described herein, such that the instruction 52 in the next slot 54 of the instruction word 48 will be executed. The acknowledge line 72 stays high until the next instruction 52 is decoded, in order to prevent spurious addresses from reaching the address bus.

In any case when the instruction 52 being executed is in the slot three position of the instruction word 48, the computer 12 will fetch the next awaiting eighteen-bit instruction word 48 unless, of course, bit i4 66 is a '0'. In actual practice, the present inventive mechanism includes a method and apparatus for "prefetching" instructions such that the fetch can begin before the end of the execution of all instructions 52 in the instruction word 48. However, this also is not a necessary aspect of the present inventive method and apparatus for asynchronous data communications.

The above example wherein computer 12e is writing to computer 12c has been described in detail. As can be appreciated in light of the above discussion, the operations are essentially the same whether computer 12e attempts to write to computer 12c first, or whether computer 12c first attempts to read from computer 12e. The operation cannot be completed until both computers 12 and 12c are ready and, whichever computer 12e or 12c is ready first, that first computer 12 simply "goes to sleep" until the other computer 12e or 12c completes the transfer. Another way of looking at the above described process is that, actually, both the writing computer 12e and the receiving computer 12c go to sleep when they execute the write and read instructions, respectively, but the last one to enter into the transaction reawakens nearly instantaneously when both the read line 18 and the write line 20 are high, whereas the first computer 12 to initiate the transaction can stay asleep nearly indefinitely until the second computer 12 is ready to complete the process.

The inventor believes that a key feature for enabling efficient asynchronous communications between devices is some sort of acknowledge signal or condition: In the prior art, most communication between devices has been clocked and there is no direct way for a sending device to know that the receiving device has properly received the data. Methods such as checksum operations may have been used to attempt to insure that data is correctly received, but the sending device has no direct indication that the operation is completed. The present inventive method, as described herein, provides the necessary acknowledge condition that allows, or at least makes practical, asynchronous communications between the devices. Furthermore, the acknowledge condition also makes it possible for one or more of the devices to "go to sleep" until the acknowledge condition occurs. Of course, an acknowledge condition could be communicated between the computers 12 by a separate signal being sent between the computers 12 (either over the interconnecting data bus 16 or over a separate signal line), and such an acknowledge signal would be within the scope of this aspect of the present invention. However, according to the embodiment of the invention described herein, it can be, appreciated that there is even more economy involved here, in that the method for acknowledgement does not require any additional signal, clock cycle, timing pulse, or any such resource beyond that described, to actually affect the communication.

In light of the above discussion of the procedures and means for accomplishing. them, the following brief description of an example of the inventive method can now be understood. FIG. 6 is a flow diagram, designated by the reference character 74, depicting this method example. In an 'initiate communication' operation 76 one computer 12 executes an instruction 53 that causes it to attempt to communicate with another computer 12. This can be either an attempt to write or an attempt to read. In a 'set first line high' operation 78, which occurs generally simultaneously with the 'initiate communication' operation 76, either a read line 18 or a write line 20 is set high (depending upon whether the first computer 12 is attempting to read or to write). As a part of the 'set first line high' operation, the computer 12 doing so will, according the presently described embodiment of the operation, cease operation, as described in detail previously herein. In a 'set second line high' operation 80 the second line (either the write line 20 or read line 18) is set high by the second computer 12. In a 'communicate data operation' data (or instructions, or the like) is transmitted and received over the data lines 22. In a 'pull lines low' operation 84, the read line 18 and the write line 20 are released and then pulled low. In a 'continue' operation 86 the acknowledge condition causes the computers 12 to resume their operation. In the case of the present inventive example, the acknowledge condition causes an acknowledge signal 86 (FIG. 5) which, in this case, is simply the "high" condition of the acknowledge line 72.

Various modifications may be made to the invention without altering its value or scope. For example, while this invention has been described herein in terms of read instructions and write instructions, in actual practice there may be more than one read type instruction and/or more than one write type instruction. As just one example, in one embodiment of the invention there is a write instruction that increments the register and other write instructions that do not. Similarly, write instructions can vary according to which register 40 is used to select communications ports 38, or the like, as discussed previously herein. There can also be a number of different read instructions, depending only upon which variations the designer of the computers 12 deems to be a useful choice of alternative read behaviors.

Similarly, while the present invention has been described herein in relation to communications between computers 12 in an array 10 on a single die 14, the same principles and method can be used, or modified for use, to accomplish other inter-device communications, such as communications between a computer 12 and its dedicated memory or between a computer 12 in an array 10 and an external device (through an input/output port, or the like). Indeed, it is anticipated that some applications may require arrays of arrays—with the presently described inter device communication method being potentially applied to communication among the arrays of arrays.

While specific examples of the inventive computer array 10 and computer 12 have been discussed therein, it is expected that there will be a great many applications for these which have not yet been envisioned. Indeed, it is one of the advantages of the present invention that the inventive method and apparatus may be adapted to a great variety of uses.

All of the above are only some of the examples of available embodiments of the present invention. Those skilled in the art will readily observe that numerous other modifications and alterations may be made without departing from the spirit and scope of the invention. Accordingly, the disclosure herein is not intended as limiting and the appended claims are to be interpreted as encompassing the entire scope of the invention.

INDUSTRIAL APPLICABILITY

The inventive computer array 10, computers 12 and associated method 74 are intended to be widely used in a great variety of computer applications. It is expected that it they will be particularly useful in applications where significant computing power is required, and yet power consumption and heat production are important considerations.

As discussed previously herein, the applicability of the present invention is such that many types of inter-device computer communications can be improved thereby. It is anticipated that the inventive method; wherein some computers can be allowed to "go to sleep" when not in use, will be used to reduce power consumption, reduce heat production, and improve the efficiency of communication between computers and computerized devices in a great variety of applications and implementations.

Since the computer array 10, computer 12 and method 74 of the present invention may be readily produced and integrated with existing tasks, input/output devices, and the like, and since the advantages as described herein are provided, it is expected that they will be readily accepted in the industry. For these and other reasons, it is expected that the utility and industrial applicability of the invention will be both significant in scope and long-lasting in duration.

I claim:

1. A computer array, comprising:
   a plurality of computers, each of said computers including a processor for executing instructions and a memory; and
   a plurality of bidirectional data paths connecting said computers, each of said data paths dedicated between a pair of said computers and including a read line, a write line, and a plurality of data lines; and wherein
   one of said data paths connects a first computer and a second computer; said first computer is configured to indicate its readiness to communicate with said second computer by asserting a first signal on one of said read line and said write line of said data path connecting said first computer and said second computer;
   said second computer is configured to indicate its readiness to communicate with said first computer by asserting a second signal on the other of said read line and said write line;
   said first computer and said second computer being configured such that when both said read line and said write line have signals asserted thereon, then data is transferred between said first computer and said second computer via said data lines of said data path connecting said first computer and said second computer;
   and further such that when said data is transferred between said first computer and said second computer, then said first signal and said second signal change; and
   the changing of said first signal and said second signal is an acknowledgement to at least one of said first computer and said second computer that said data has been successfully transferred between said first computer and said second computer.

2. A computer array according to claim 1, wherein:
   said first computer is configured to indicate its readiness to communicate by asserting a logical high signal on one of said write line and said read line; and
   said second computer indicates its readiness to communicate by asserting a logical high signal on the other of said write line and said read line.

3. A computer array according to claim 2, wherein said first computer and said second computer are configured such that when said data is transferred between said first computer and said second computer, then said read line and said write line are pulled low.

4. A computer array according to claim 1, wherein said first computer is configured to indicate a readiness to write said data to said second computer by asserting said first signal on said write line.

5. A computer array according to claim 4, wherein said second computer is configured to indicate a readiness to read said data from said first computer by asserting said second signal on said read line.

6. A computer array according to claim 5, wherein:
   said first computer and said second computer are configured such that after said first signal and said second signal are asserted, said first computer releases said write line; and said second computer causes said first signal and said second signal to change.

7. A computer array according to claim 1, wherein:
   said first computer and said second computer are configured such that after said first signal and said second signal are asserted, said first computer and said second computer release said read line and said write line; and further such that whichever of said first computer and said second computer had asserted a signal on the read line causes said first signal and said second signal to change.

8. A computer array according to claim 1, wherein said first computer and said second computer are each configured such that the direction of data transfer between said first computer and said second computer is determined by programs executed by said first computer and said second computer.

9. A computer array according to claim 1, wherein:
each of said computers includes its own sequencer, said sequencer being responsive to input from at least one of an instruction word and said acknowledgement and operative to selectively produce a timing pulse for causing the execution of a subsequent instruction by the computer associated with said sequencer; and
further such that said first computer is configured such that when said first computer indicates its readiness to communicate with said second computer, then said first computer stops operation by suspending production of said timing pulse from said sequencer of said first computer.

10. A computer array according to claim 9, wherein said second computer is configured such that when said second computer indicates its readiness to communicate with said first computer, then said second computer stops operation by suspending the triggering of said timing pulse from said sequencer of said second computer.

11. A computer array according to claim 10, wherein said first computer and said second computer are configured such that when said first signal and said second signal change, then said sequencer of said first computer produces another said timing pulse such that said first computer resumes operation and further such that said sequencer of said second computer produces another said timing pulse such that said second computer resumes operation.

12. A computer array according to claim 9, wherein:
said sequencer is configured to automatically suspended producing another said timing pulse when said computer executes one of a read instruction and a write instruction.

13. A computer array according to claim 1, wherein said plurality of computers is integrated on a single die.

14. A computer array according to claim 1, wherein said first computer is configured to simultaneously indicate its readiness to communicate with said second computer and at least one other computer.

15. A method for communicating between a first computer and a second computer connected via a dedicated data path therebetween, said data path including a read line, a write line, and a plurality of data lines, said method comprising:
causing said first computer to indicate its readiness to communicate with said second computer by asserting a first signal on one of said read line and said write line;
causing said second computer to indicate its readiness to complete a communication with said first computer by asserting a second signal on the other of said read line and said write line;
transferring data between said first computer and said second computer via said plurality of data lines when said first computer and said second computer have indicated their readiness to communicate; and
causing one of said first computer and said second computer to generate an acknowledgement to the other of said first computer and said second computer that said data has been transferred by changing the values of said first signal and said second signal.

16. A method according to claim 15, wherein:
said step of causing said first computer to indicate its readiness to communicate includes causing said first computer to assert a logical high signal on one of said write line and said read line; and
said step of causing said second computer to indicate its readiness to complete said communication includes causing said second computer to assert a logical high signal on the other of said write line and said read line.

17. A method according to claim 16, wherein said step of causing one of said first computer and said second computer to generate said acknowledgement includes causing said one of said first computer and said second computer to cause a logical low signal to be asserted on said read line and said write line.

18. A method according to claim 15, wherein said step of causing said first computer to indicate its readiness to communicate includes causing said first computer to indicate its readiness to write said data to said second computer by asserting said first signal on said write line.

19. A method according to claim 18, wherein said step of causing said second computer to indicate its readiness to complete said communication includes causing said second computer to indicate its readiness to read said data from said first computer by asserting said second signal on said read line.

20. A method according to claim 19, further comprising:
causing said first computer to release said write line after said first signal and said second signal are asserted; and wherein
said second computer causes said first signal and said second signal to change.

21. A method according to claim 15, further comprising:
causing said first computer and said second computer to release said read line and said write line after said first signal and said second signal have been asserted; and wherein said step of causing one of said first computer and said second computer to generate an acknowledgement includes causing the reading one of said first computer and said second computer to cause said first signal and said second signal to change.

22. A method according to claim 15, wherein the direction of data transfer between said first computer and said second computer is determined by programs executed by said first computer and said second computer.

23. A method according to claim 15, further comprising:
causing said first computer to simultaneously indicate its readiness to communicate with said second computer and at least one other computer.

24. A computer array, comprising:
a plurality of computers, each of said computers including a processor for executing instructions and a memory;
a plurality of bidirectional data paths connecting said computers, each of said data paths dedicated between a pair of said computers and including a read line, a write line, and a plurality of data lines;
means for causing said first computer to indicate its readiness to communicate with said second computer via one of said read line and said write line;
means for causing said second computer to indicate its readiness to complete a communication with said first computer by via the other of said read line and said write line;
means for transferring data between said first computer and said second computer when said first computer and said second computer have indicated their readiness to communicate; and means for acknowledging to at least one of said first computer and said second computer that said communication has been completed, said acknowledgment occurring via at least one of said read line and said write line.

25. A computer array, comprising:
a plurality of computers, each of said computers including a processor for executing instructions; and
a bidirectional data path connecting a first computer and a second computer in the computer array, said data path including a read line, a write line, and a plurality of data lines; wherein
said first computer is configured to set the write line when it is ready to write to the second computer and further to set the read line high when it is ready to read from the second computer;
said second computer is configured to set the write line high when it is ready to write to the first computer and further to set the read line high when it is ready to read from the second computer; and
said first computer and said second computer are configured such that when both the read line and the write line are simultaneously high then data is transferred via the data lines from whichever of the first computer or the second computer had set the write line high to whichever of the first computer or the second computer had set the read line high.

26. The computer array of claim 25, wherein:
both the first computer and the second computer are configured to release both the read line and the write line when data is transferred.

27. The computer array of claim 26, wherein:
both the first computer and the second computer are configured such that whichever of the first computer or the second computer had set the read line high pulls both the read line and the write line low when the data has been transferred.

28. The computer array of claim 25, wherein:
the first computer is configured to set either the read line or the write line high by asserting a predetermined voltage on either the read line or the write line; and
the second computer is configured to set either the read line or the write line high by asserting a predetermined voltage on either the read line or the write line.

29. The computer array of claim 27, wherein:
both the first computer and the second computer are configured to set the read line and the write linen low by asserting a predetermined voltage on both the read line and the write line, said predetermined voltage being different from the voltage thereon when the read line and the right line are pulled high.

30. The computer array of claim 29, wherein:
the predetermined voltage is zero volts.

* * * * *